Patented Sept. 13, 1932

1,876,652

UNITED STATES PATENT OFFICE

SIEGFRIED FISCHL, OF BERLIN-BAUMSCHULENWEG, AND HANS STEINER, OF BERLIN-ADLERSHOF, GERMANY, ASSIGNORS TO THE FIRM SCHERING-KAHLBAUM A.-G., OF BERLIN, GERMANY

PRODUCTION OF ACID NITRILES

No Drawing. Application filed November 19, 1929, Serial No. 408,408, and in Germany November 29, 1928.

Our invention refers to the production of nitriles and more especially acid nitriles adapted for use in the production of pharmaceutical preparations.

Hitherto acid nitriles have been obtained only in a few cases by acting on the ammonium salts of the corresponding carboxylic acids with dehydrating agents such as phosphorus pentoxide. If salts of monocarboxylic acids were used, only a very poor yield was obtained while dicarboxylic acids do not appear to ever have been subjected to such treatment.

We have now found that acid nitriles can be produced from the ammonium salts of monocarboxylic acids as well as dicarboxylic acids by acting thereon with acid chlorides, such as for instance phosphorus oxychloride, phosphorus trichloride, p-toluene sulfonylchloride etc. in the presence of organic bases, which are not capable of saponifying the nitriles at the temperature of the reaction. Pyridine and dimethyl aniline have proved to be particularly valuable. The process occurs according to the equations:

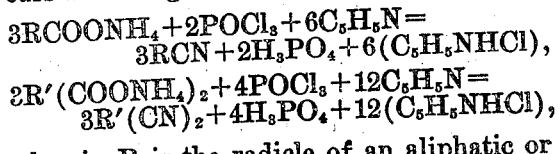

wherein R is the radicle of an aliphatic or aromatic monocarboxylic acid, R' the radicle of a dicarboxylic acid.

Contrary to expectations this process proceeds very smoothly and very good yields are obtained. The products are treated further in accordance with their character. In most cases there is no need of isolating the ammonium salts, it being only necessary to introduce ammonia gas into a solution or suspension of the carboxylic acids in pyridine etc. to the saturation point and to thereupon add the acid chloride while stirring.

*Example 1.*—200 parts by weight of neutral ammonium sebacate (obtainable in almost quantitative yield by saturating an alcoholic solution of sebacic acid with ammonia) are suspended in three times their volume of pyridine and the suspension is heated to about 50 C. in the oil bath. While stirring, 250 parts phosphorus oxychloride are introduced, the temperature rising gradually to about 110° C. in proportion as the ammonium salt dissolves, and the pyridine being heated to the boiling point. After the main quantity has been introduced, the liquor stops boiling and is now heated further to 120–130° C. for 2 hours. A great quantity of water is added, the sebacic acid dinitrile which has separated out in the form of an oil is dissolved in benzene, washed to neutral reaction and distilled. There results the almost colorless dinitrile boiling at 192–198° C. in a vacuum of 20 mms. The yield (130 parts) corresponds to 93% of the calculated quantity.

*Example 2.*—200 parts sebacic acid are dissolved in pyridine and saturated with ammonia, the excess of ammonia is expelled by a current of air and the solution is heated with 295 parts phosphorus oxychloride and treated further as described with reference to Example 1. There result 132 parts of distilled nitrile boiling at 192–197° C. in a vacuum of 20 mms. (corresponding to 81% of the quantity calculated for sebacic acid).

*Example 3.*—When replacing phosphorus oxychloride by phosphorus trichloride which in the presence of pyridine has about the same action, lower yields are obtained. 200 parts of the ammonium salt resulted in 67 parts sebacic acid dinitrile.

*Example 4.*—If p-toluene sulfonylchloride is used in lieu of phosphorous oxychloride (Example 1) there are obtained from 200 parts of the ammonium salt 127 parts distilled sebacic acid dinitrile corresponding to about 90% of the calculated quantity.

*Example 5.*—If the pyridine in Example 1 is replaced by dimethyl aniline, the temperature of the reaction mixture, when phosphorus oxychloride is added drop by drop, will rise to about 140° C. whereupon the ammonium salt is soon dissolved. After further treatment as described the crude nitrile is freed from dimethyl aniline which has separated out also, by distillation in vacuo. 200 parts of the ammonium salt yield 105 parts distilled nitrile corresponding to about 80% of the calculated quantity.

*Example 6.*—104 parts neutral ammonium suberate are dissolved in 300 parts pyridine and are treated with 163 parts phosphorus oxychloride as described with reference to Example 1. There are obtained 56 parts (corresponding to about 85% of the calculated quantity) of very pure limpid suberic acid dinitrile boiling at 197–199° C. in a vacuum of 23 mms. and solidifying in a refrigerating mixture at −3.5–4° C. (see Hamonet, Comptes Rendus 136, p. 246).

*Example 7.*—230 parts ammonium acetate are introduced into 700 parts pyridine and treated under stirring with 400 parts phosphorus oxychloride according to Example 1. Finally the aceto-nitrile which has formed, can be distilled directly from the undiluted reaction mass in an oil bath. Pyridine and a great quantity of pyridine hydrochloride remain over. There are obtained 103 parts aceto-nitrile boiling at 80–83° C. and having a specific gravity of 0.79.

*Example 8.*—208 parts ammonium benzoate are suspended in pyridine and heated with 200 parts phosphorus oxychloride at 120–130° C. The reaction mixture is then diluted, the oil which has separated out is dissolved in benzene and subjected to distillation. There are obtained more than 60% of distilled limpid benzonitrile boiling at 187–192° C. and having a specific gravity of 0.98.

Various changes may be made in the details disclosed in the foregoing specification without departing from the invention or sacrificing the advantages thereof.

We claim:—

1. The method of producing acid nitriles comprising acting on the neutral ammonium salt of the saturated carboxylic acid corresponding to the nitrile and having a like number of C-atoms with an acid chloride of the group constituted by phosphorous oxychloride, phosphorous trichloride and arylsulfochloride in the presence of a weak organic base which is not capable of saponifying at the temperature of the reaction the nitrile formed in the reaction.

2. The method of producing acid nitriles comprising acting on the neutral ammonium salt of the saturated carboxylic acid corresponding to the nitrile and having a like number of C-atoms with an acid chloride of the group constituted by phosphorous oxychloride, phosphorous trichloride and arylsulfochloride in the presence of pyridine.

3. The method of producing acid nitriles comprising acting on the neutral ammonium salt of the saturated carboxylic acid corresponding to the nitrile and having a like number of C-atoms with p-toluene sulfochloride in the presence of a weak organic base which is not capable of saponifying at the temperature of the reaction the nitrile formed in the reaction.

4. The method of producing acid nitriles comprising acting on the neutral ammonium salt of the saturated carboxylic acid corresponding to the nitrile and having a like number of C-atoms with p-toluene sulfochloride in the presence of pyridine.

5. The method of producing acid nitriles comprising acting on the neutral ammonium salt of the saturated dicarboxylic acid corresponding to the nitrile and having a like number of C-atoms with an acid chloride of the group constituted by phosphorous oxychloride, phosphorous trichloride and arylsulfochloride in the presence of a weak organic base which is not capable of saponifying at the temperature of the reaction the nitrile formed in the reaction.

6. The method of producing acid nitriles comprising acting on the neutral ammonium salt of the saturated dicarboxylic acid corresponding to the nitrile and having a like number of C-atoms with an acid chloride of the group constituted by phosphorous oxychloride, phosphorous trichloride and arylsulfochloride in the presence of pyridine.

7. The method of producing acid nitriles comprising acting on the neutral ammonium salt of the saturated dicarboxylic acid corresponding to the nitrile and having a like number of C-atoms with p-toluene sulfochloride in the presence of pyridine.

8. The method of producing acid nitriles comprising dissolving the saturated dicarboxylic acid corresponding to the nitrile and having a like number of C-atoms in a weak organic base, saturating the solution with ammonia and acting on the ammonium salt thus formed with an acid chloride of the group constituted by phosphorous oxychloride, phosphorous trichloride and arylsulfochloride in the presence of a weak organic base which is not capable of saponifying the nitrile at the temperature of the reaction.

9. The method of producing acid nitriles comprising dissolving the saturated dicarboxylic acid corresponding to the nitrile and having a like number of C-atoms in a weak organic base, saturating the solution with ammonia and acting on the ammonium salt thus formed with an acid chloride of the group constituted by phosphorous oxychloride, phosphorous trichloride and arylsulfochloride in the presence of pyridine.

10. The method of producing acid nitriles comprising dissolving the saturated dicarboxylic acid corresponding to the nitrile and having a like number of C-atoms in a weak organic base, saturating the solution with ammonia and acting on the ammonium salt thus formed with p-toluene sulfochloride in the presence of pyridine.

11. The method of producing sebacic acid dinitrile comprising acting on the neutral ammonium salt of sebacic acid with an acid chloride of the group constituted by phosphorous oxychloride, phosphorous trichloride and arylsulfochloride in the presence of a weak organic base which is not capble of saponifying at the temperature of the reaction the nitrile formed in the reaction.

12. The method of producing sebacic acid dinitrile comprising acting on the neutral ammonium salt of sebacic acid with an acid chloride of the group constituted by phosphorous oxychloride, phosphorous trichloride and arylsulfochloride in the presence of pyridine.

13. The method of producing sebacic acid dinitrile comprising acting on the neutral ammonium salt of sebacic acid with p-toluene sulfochloride in the presence of pyridine.

14. The method of producing sebacic acid dinitrile comprising dissolving sebacic acid in a weak organic base, saturating the solution with ammonia and acting on the ammonium salt thus formed with an acid chloride of the group constituted by phosphorous oxychloride, phosphorous trichloride and arylsulfochloride in the presence of a weak organic base which is not capable of saponifying at the temperature of the reaction the nitrile formed in the reaction.

15. The method of producing sebacic acid dinitrile comprising dissolving sebacic acid in a weak organic base, saturating the solution with ammonia and acting on the ammonium salt thus formed with an acid chloride of the group constituted by phosphorous oxychloride, phosphorous trichloride and arylsulfochloride in the presence of pyridine.

16. The method of producing sebacic acid dinitrile comprising dissolving sebacic acid in a weak organic base, saturating the solution with ammonia and acting on the ammonium salt thus formed with p-toluene sulfonylchloride in the presence of pyridine.

In testimony whereof we affix our signatures.

SIEGFRIED FISCHL.
HANS STEINER.